Nov. 25, 1947.  E. G. MUELLER  2,431,579
CLASP BRAKE RIGGING
Filed Jan. 17, 1946
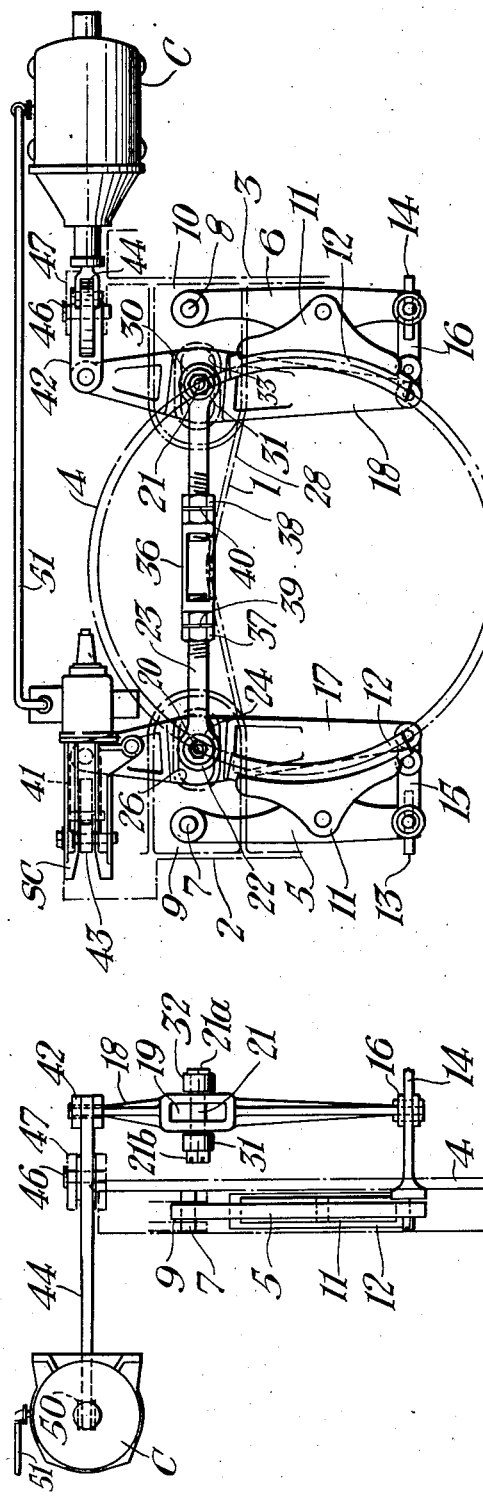
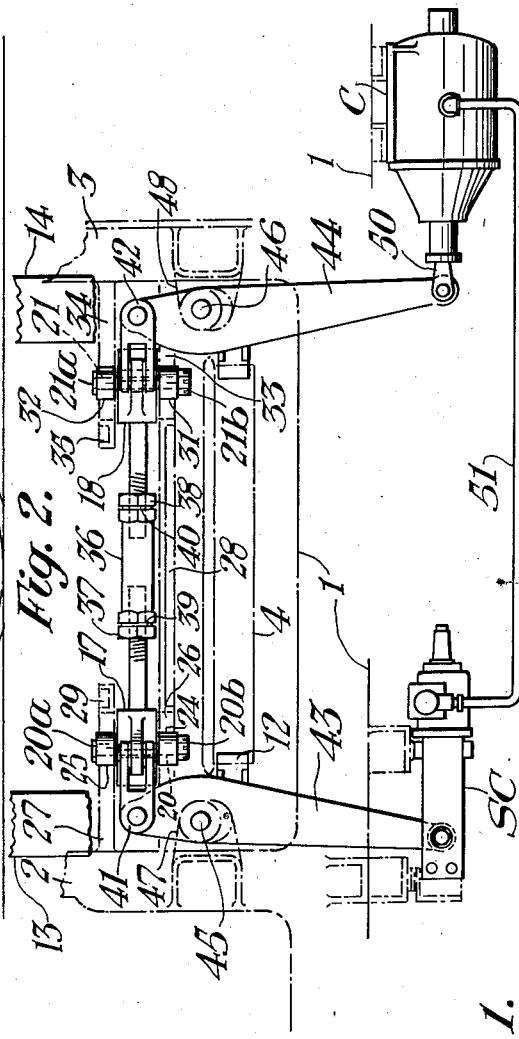
INVENTOR
Emil G. Mueller.
BY
HIS ATTORNEY Patented Nov. 25, 1947

2,431,579

UNITED STATES PATENT OFFICE 2,431,579

CLASP BRAKE RIGGING

Emil G. Mueller, Churchill Borough, Pa., assignor to The American Brake Company, Swissvale, Pa., a corporation of Missouri Application January 17, 1946, Serial No. 641,771

8 Claims. (Cl. 188—56)

My invention relates to brake rigging, and particularly to a unit cylinder clasp brake arrangement suitable for application to the middle wheels of a six-wheel Diesel electric locomotive truck having motors connected to the end axles only.

One object of my invention is to provide a novel lightweight brake arrangement of the type described which can be mounted in the limited space available on a truck of the type described, which will supply the desired braking force, and which will readily release following an application of the brakes.

In accordance with my invention, the brake comprises two vertical levers which are disposed on opposite sides of the middle wheel and which carry brake shoes for frictionally engaging the wheel when the brakes are applied. These levers are pivotally attached at their upper ends to the truck frame and are operatively connected at their lower ends in supporting relation thereto with brake beams which extend transversely of the wheels. The brake beams are connected inboard of the wheels with the lower ends of vertically disposed live levers pivoted intermediate their ends on pivot pins supported on opposite sides of the lever by means of rollers disposed in horizontal guideways cast in the frame. The pivot pins also receive eyes on the opposite ends of an adjustable tie rod which serves as a manual slack adjuster. The upper ends of the live levers are connected with the inner ends of horizontal levers pivotally mounted intermediate their ends on pivot pins carried by suitable pin supports cast integrally with the truck frame. The outer end of one horizontal lever is operatively connected with an automatic slack adjuster bolted to the frame outboard of the wheels in approximately the same plane as the top of the wheels, and the outer end of the other horizontal lever is operatively connected with the piston rod of a brake cylinder which is also bolted to the frame outboard of the wheels in approximately the same plane as the top of the wheels.

Other objects and characteristic features of my invention will become apparent as the description proceeds.

I shall describe one form of brake rigging embodying my invention, and shall then point out the novel features thereof in claims.

In the accompanying drawings, Fig. 1 is a top plan view of a railway locomotive truck provided with one form of brake rigging embodying my invention. Fig. 2 is a side elevational view of the portion of the truck and brake rigging shown in Fig. 1. Fig. 3 is a right-hand end view of a portion of the brake rigging and locomotive truck shown in Fig. 1.

Similar reference characters refer to similar parts in all three views.

As was pointed out above, the brake rigging embodying my invention is of a unit cylinder clasp type which is particularly suitable for application to the middle wheels of a six-wheel Diesel electric locomotive truck having motors connected to the two end axles only, and accordingly in the drawings I have illustrated only that portion of the truck which supports the brake rigging for the one middle wheel of the truck. It will be understood that the two end wheels of the truck may be provided with any desired form of brake rigging which in actual practice will usually be of the unit cylinder clasp type.

Referring to the drawings, the truck is an integral structure comprising side members 1 only one of which is shown, integrally joined with transversely extending load carrying members 2 and 3 disposed on opposite sides of the middle wheel 4 of the truck, and providing means for supporting the usual span bolster (not shown).

The brake rigging for the middle wheel 4 in the form illustrated comprises two vertical brake levers 5 and 6 pivotally attached at their upper ends to the side member 1 on opposite sides of the wheel 4 by means of pivot pins 7 and 8 mounted in pin supports 9 and 10, respectively. Each of the vertical brake levers is provided intermediate its ends with a brake head 11 carrying a brake shoe 12 for engagement with the periphery of the wheel, and the lower ends of these levers are pivotally attached to brake beams 13 and 14, respectively, in supporting relation thereto.

The brake beams 13 and 14 are connected inboard of the wheels by means of double jaws 15 and 16 with the lower ends of two vertically disposed live levers 17 and 18. Each of the live levers 17 and 18 is provided intermediate its ends with a rectangular opening 19 (see Fig. 3) and extending through these openings are pivot pins 20 and 21, respectively. The pivot pin 20 also extends within the associated opening 19 through an eye 22 formed on one end of a tie rod 23, and is provided on opposite sides of the pivot pin with rollers 24 and 25 held in place by a head 20a formed on one end of the pin and a nut 20b screwed onto the other end of the pin. The rollers 24 and 25 are disposed in rectangular guideways 26 and 27 provided respectively on a frame brace 28 extending parallel to the side member 1 on the inside of the wheel 4, and in a spaced lug 29 provided on the transverse load carrying member 2. The pivot pin 21 similarly extends within the associated opening 19 in the lever 18 through an eye 30 provided on the end of the tie rod 23 opposite to the eye 22 and carries on opposite sides of the pivot pin rollers 31 and 32 held in place by the head 21a of the pivot pin and a nut 21b screwed onto the pivot pin. The rollers 31 and 32 are disposed in longitudinally extending rectangular guideways 33 and 34 formed respectively in the frame brace 28 and in a spaced lug 35 provided on the transverse load carrying member 3. The tie rod 23 is provided intermediate its ends with a turnbuckle 36 adapted to be locked in adjusted positions by means of lock nuts 37 and 38 and lock washers 39 and 40, respectively. It will be obvious that by adjusting the turnbuckle the distance between the two pivot pins 20 and 21 which support the live levers 17 and 18 can be readily varied to thereby enable the tie rod to function as a manual slack adjuster.

The upper ends of the live levers 17 and 18 are connected by means of double jaws 41 and 42 with the inner ends of two transversely extending horizontal levers 43 and 44, respectively. The levers 43 and 44 are pivoted intermediate their ends on pivot pins 45 and 46 mounted in pin supports 47 and 48 provided on the load carrying members 2 and 3. The lever 43 is operatively connected at its outer end with an automatic slack adjuster SC while the lever 44 is operatively connected at its outer end with the piston rod 50 of a brake cylinder C.

The automatic slack adjuster SC is bolted to the side member 1 outboard of the wheel 2 in approximately the plane of the top of the wheels and is connected to the brake cylinder by a pipe 51. The slack adjuster by itself forms no part of my present invention and may comprise any of the well-known types which will move the effective point of connection of the outer end of the lever 43 toward the right a predetermined amount each time the slack adjuster is supplied with air pressure.

The pipe 51 is connected with the brake cylinder C at such a point that as long as no slack is present in the brake rigging, the brake cylinder piston in applying the brakes will not move far enough to admit air to the pipe 51, but that, when slack develops, the additional movement of the piston necessary to fully apply the brakes will then cause fluid pressure to be admitted to the pipe from the pressure side of the piston and will thus cause the slack adjuster to automatically take up the slack.

The brake cylinder C is secured to the side member 1 outboard of the wheel 4 in approximately the same plane as the slack adjuster SC. The fact that the slack adjuster and brake cylinder are mounted in the positions just described insures the necessary clearances between these parts and the car parts and at the same time renders the brake cylinder and slack adjuster together with the connections therefrom to the other parts of the brake rigging readily accessible for adjustment, inspection and repair or replacement.

In operation when fluid is supplied to the brake cylinder C, the push rod 50 will move outwardly and will thus rotate the horizontal lever 44 in a clockwise direction about the pivot pin 46. This rotation of the lever 44 in turn will act through the double jaw 42 to rotate the vertical lever 18 in a clockwise direction about the pivot pin 21 and will thus move the brake beam 14 toward the wheel 4. As the brake beam 14 moves toward the wheel 4, it will cause the brake lever 6 to swing toward the wheel to the position in which the associated brake shoe 12 frictionally engages the wheel. As soon as the lever 6 reaches this position, further rotation of the vertical lever 18 about the pivot pin 21 will be prevented and this lever will then fulcrum about its point of connection with the double jaw 16 and will thus cause the pull rod 36 to move toward the right. Due to the fact that the horizontal lever 43 is connected at its outer end to the slack adjuster SC the lever 17 will be constrained to rotate about its point of connection with the double jaw 41 and the movement of the rod 23 toward the right will accordingly cause the brake beam 13 to swing toward the wheel and hence move the brake lever 5 to the position in which the associated brake shoe 12 frictionally engages the wheel. The parts are so proportioned that when the brake shoes have both moved into engagement with the wheel, they will exert substantially equal and opposite braking forces as is customary in clasp brake designs.

Upon the fluid being vented from the brake cylinder following a brake application the release spring in the brake cylinder will move the push rod 50 toward its retracted position and will thus remove the force which caused the parts to move to their brake applying positions. As soon as this force is removed, the weight of the brake shoes, heads and beams due to the angular disposition of the parts will tend to cause the brake levers to swing away from the wheels so that a quick release of the brakes will be effected.

It will be obvious that if slack develops in the brake rigging, the resultant additional movement of the piston of the brake cylinder C necessary to effect a brake application will act to admit fluid to the slack adjuster SC in the manner outlined hereinbefore, and the fluid thus admitted to the slack adjuster will cause the fulcrum block of the slack adjuster to move toward the right a sufficient amount to take up the slack and thus maintain a maximum limit of piston travel in cylinder C and a maximum of shoe release while the locomotive is in operation. At the ends of runs or when new shoes are applied the fulcrum block in slack adjuster SC is reset to its initial position and all excess slack is taken up by adjusting the manual slack adjuster comprising the turnbuckle 36.

It should be particularly pointed out that while in describing my invention I have shown it applied to the middle wheel of a six-wheel Diesel electric locomotive truck having motors connected to the two end axles, this brake rigging may equally well be applied to any other form of truck where the necessary clearances are available.

One advantage of brake rigging embodying my invention is that relatively few parts are required, which parts are disposed insofar as possible in positions where they are accessible and where they have ample clearances.

Another advantage of brake rigging embodying my invention is that the structure is light in weight and yet is sufficiently strong to readily transmit the desired braking forces.

Although I have herein shown and described only one form of brake rigging embodying my invention, it is understood that various changes and modifications may be made therein within

Having thus described my invention, what I claim is:

1. In a truck brake rigging, the combination with the truck frame and a supporting wheel therefor, of two vertical brake levers pivotally attached at their upper ends to said frame on opposite sides of said wheel and provided intermediate their ends with means for frictionally engaging said wheel, two brake beams supported by the lower ends of said brake levers, vertically disposed live levers connected at their lower ends to said brake beams and pivoted intermediate their ends on pivot pins supported on rollers disposed in guideways provided in said frame, an adjustable tie rod provided with eyes which receive said pivot pins for manually taking up slack in said brake rigging, power means connected with the upper end of the one live lever, and means for restricting the movement of the upper end of the other lever to that necessary to cause an application of the brakes in response to operation of said power means.

2. In a truck brake rigging, the combination with the truck frame and a supporting wheel therefor, of two vertical brake levers pivotally attached at their upper ends to said frame on opposite sides of said wheel and provided intermediate their ends with means for frictionally engaging said wheel, two brake beams supported by the lower ends of said brake levers, vertically disposed live levers connected at their lower ends to said brake beams and pivoted intermediate their ends on pivot pins supported on rollers disposed in guideways provided in said frame, an adjustable tie rod provided with eyes which receive said pivot pins for manually taking up slack in said brake rigging, power means connected with the upper end of the one live lever, and an automatic slack adjuster operatively connected with the upper end of the other live lever.

3. In a truck brake rigging, the combination with the truck frame and a supporting wheel therefor, of two vertical brake levers pivotally attached at their upper ends to said frame on opposite sides of said wheel and provided intermediate their ends with means for frictionally engaging said wheel, two brake beams supported by the lower ends of said brake levers, vertically disposed live levers connected at their lower ends to said brake beams and pivoted intermediate their ends on pivot pins supported on rollers disposed in guideways provided in said frame, an adjustable tie rod provided with eyes which receive said pivot pins for manually taking up slack in said brake rigging, a first horizontal lever pivotally supported intermediate its ends on the truck frame and operatively connected at its inner end with the upper end of one of said live levers, a second horizontal lever pivotally supported intermediate its ends on the truck frame and operatively connected at its inner end with the upper end of the other live lever, an automatic slack adjuster mounted in the truck frame and connected to the outer end of said first horizontal lever, and a brake cylinder mounted on the truck frame and operatively connected with the outer end of said second horizontal lever.

4. In a truck brake rigging, the combination with a frame comprising a side member integrally joined to two transversely extending load carrying members disposed on opposite sides of a supporting wheel and connected inboard of the wheel by a frame brace, of two vertically disposed live levers each provided intermediate its ends with a rectangular opening, pivot pins extending through said openings and each provided on each side of the associated lever with a roller, the one said roller on each pin being disposed in a guideway provided in said frame brace and the other said roller on each pin being disposed in a guideway formed in a lug provided on the adjacent load carrying member, a tie rod provided at its ends with eyes which receive said pivot pins within the openings in said levers, brake applying means connected with the lower ends of said levers, and means connected with the upper ends of said levers whereby actuation of the one lever will actuate said brake applying means.

5. In a truck brake rigging, the combination with a frame comprising a side member integrally joined to two transversely extending load carrying members disposed on opposite sides of a supporting wheel and connected inboard of the wheel by a frame brace, of two vertically disposed live levers each provided intermediate its ends with a rectangular opening, pivot pins extending through said openings and each provided on each side of the associated lever with a roller, the one said roller on each pin being disposed in a guideway provided in said frame brace and the other said roller on each pin being disposed in a guideway formed in a lug provided on the adjacent load carrying member, a tie rod provided at its ends with eyes which receive said pivot pins within the openings in said levers, brake applying means connected with the lower ends of said levers, a first horizontal lever pivotally supported intermediate its ends on the truck frame and operatively connected at its inner end with the upper end of one of said live levers, a second horizontal lever pivotally supported intermediate its ends on the truck frame and operatively connected at its inner end with the upper end of the other live lever, an automatic slack adjuster mounted on the truck frame and connected to the outer end of said first horizontal lever, and a brake cylinder mounted on the truck frame and operatively connected with the outer end of said second horizontal lever.

6. In a truck brake rigging, the combination with a frame comprising a side member integrally joined to two transversely extending load carrying members disposed on opposite sides of a supporting wheel and connected inboard of the wheel by a frame brace, of two vertically disposed live levers each provided intermediate its ends with a rectangular opening, pivot pins extending through said openings and each provided on each side of the associated lever with a roller, the one said roller on each pin being disposed in a guideway provided in said frame brace and the other said roller on each pin being disposed in a guideway formed in a lug provided on the adjacent load carrying member, a tie rod provided at its ends with eyes which receive said pivot pins within the openings in said levers, brake applying means connected with the lower ends of said levers, a brake cylinder operatively connected with the upper end of the one live lever, and an automatic slack adjuster operatively connected with the upper end of the other lever.

7. In a truck brake rigging, the combination with a frame comprising a side member integrally joined to two transversely extending load carrying members disposed on opposite sides of a supporting wheel and connected inboard of the wheel by a frame brace, of two vertically disposed live levers each provided intermediate its ends with a rectangular opening, pivot pins extending through said openings and each provided on each side of the associated lever with a roller, the one said roller on each pin being disposed in a guideway provided in said frame brace and the other said roller on each pin being disposed in a guideway formed in a lug provided on the adjacent load carrying member, a tie rod provided at its ends with eyes which receive said pivot pins within the openings in said levers, brake applying means connected with the lower ends of said levers, a brake cylinder operatively connected with the upper end of the one live lever, an automatic slack adjuster operatively connected with the upper end of the other lever, and a manual slack adjuster included in said tie rod.

3. In a truck brake rigging, the combination with a frame comprising a side member integrally joined to two transversely extending load carrying members disposed on opposite sides of a supporting wheel and connected inboard of the wheel by a frame brace, of two vertically disposed live levers each provided intermediate its ends with a rectangular opening, pivot pins extending through said openings and each provided on each side of the associated lever with a roller, the one said roller on each pin being disposed in a guideway provided in said frame brace and the other said roller on each pin being disposed in a guideway formed in a lug provided on the adjacent load carrying member, a tie rod provided at its ends with eyes which receive said pivot pins within the openings in said levers, brake applying means connected with the lower ends of said levers, power means connected with the upper end of the one live lever, and means for restricting the movement of the upper end of the other lever to that necessary to cause an application of the brakes in response to operation of said power means.

EMIL G. MUELLER.

REFERENCES CITED

The following references are of record in the file of this patent:

UNITED STATES PATENTS

| Number | Name | Date |
|---|---|---|
| 1,281,510 | Burton | Oct. 15, 1918 |
| 1,787,563 | Baselt | Jan. 6, 1931 |
| 1,939,926 | Schwentler | Dec. 19, 1933 |